(No Model.)
R. W. WILLSON.
TIME BALL SIGNAL.
No. 267,298. Patented Nov. 7, 1882.
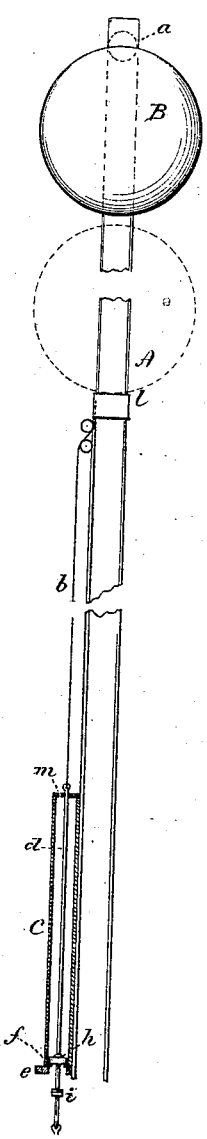
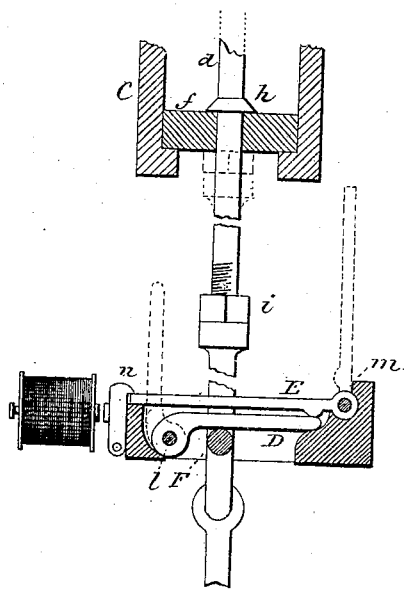
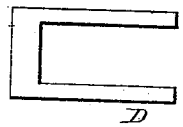
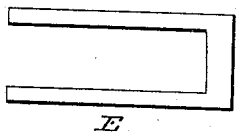

UNITED STATES PATENT OFFICE.

ROBERT W. WILLSON, OF NEW HAVEN, CONNECTICUT.

TIME-BALL SIGNAL.

SPECIFICATION forming part of Letters Patent No. 267,298, dated November 7, 1882.

Application filed April 24, 1882. (No model.)

*To all whom it may concern:*

Be it known that I, ROBERT W. WILLSON, of New Haven, in the county of New Haven and State of Connecticut, have invented a new Improvement in Time-Balls; and I do hereby declare the following, when taken in connection with accompanying drawings and the letters of reference marked thereon, to be a full, clear, and exact description of the same, and which said drawings constitute part of this specification, and represent, in—

Figure 1, a sectional side view; Fig. 2, the lower part of the cylinder and the engaging mechanism enlarged; Figs. 3 and 4, the two parts of the engaging-levers detached.

This invention relates to an improvement in that class of time-signals which consist of a ball arranged upon a vertical rod and held suspended by an electrical apparatus which is released at a certain predetermined time by electrical connection with some distant point, so that the fall of the ball will indicate that particular time, commonly called "time-balls." In order to be of any practical use, the ball should start instantly and as nearly free as possible, and move with the greatest possible rapidity from its starting-point downward. These balls are necessarily large, because of the elevated position in which they are placed, and must be heavy, first, to give the required strength to the ball, and, second, to insure the rapid descent. The arrest of the ball in its descent produces a great shock, necessitating the making of the ball very strong.

The object of my invention is to give the ball the most perfect freedom when it begins its descent, and gradually apply a counterbalancing-weight; and it consists principally in a counterbalancing-weight supported independent of the ball, when the ball is raised, with an elastic device between said weight and ball, whereby the weight is gradually applied to the descending ball, as more fully hereinafter described.

A represents the shaft or pole, upon which the ball B is arranged to slide up and down in the usual manner. A cord, *b*, or equivalent therefor is attached to the ball and passes over a pulley, *a*, above, thence down, is attached to the upper end of a rod, *d*, which runs through a cylinder, C, thence to a latching mechanism, to be hereinafter described, so as to hold the ball suspended, and so that when released the ball will fall, drawing the rod *a* upward through the cylinder C. The cylinder C, when the ball is in its highest position, is supported upon a rest, as at *e*, Fig. 1. The weight of the cylinder with the piston-rod counterbalances—that is, it is about equal to—the weight of the ball. Within the cylinder is a piston, *f*, through which the rod *d* freely passes. On the rod, above the piston, is a collar, *h*, and at a short distance below the piston a second collar, *i*. Supposing the ball to be suspended and the cylinder at its place of rest, the rod drawn down so as to bring the collar *h* to bear on the piston, as seen in Fig. 1, in this condition the cylinder E is filled with air, which may have been admitted through a small aperture, *m*, at the upper end of the cylinder or through a valve in the piston. The device which holds the ball in suspension being released. it will instantly fall, and soon after its start the collar *i* will be drawn up against the piston, as seen in Fig. 2, which will bring the weight of the ball upon the piston and draw it, with the rod, upward into the cylinder, compressing the air above until the air above the piston shall have been compressed to an extent corresponding to the weight of the cylinder. Then from that point the cylinder will rise with the ball as a counterbalancing-weight, the ball having attained sufficient momentum before the entire counterbalancing-weight is applied to carry it to its lowest point, and the weight thus applied gradually overcomes the momentum until the ball reaches its lowest position, where it stops, practically counterbalanced.

The collar *i* may be adjustable relatively to the piston, so that the first free portion of the fall may be varied. The greater the distance between the collar and the piston the greater the momentum which the ball will have attained before the weight is applied. The gradual application of the counterbalancing-weight, while it permits the ball to start perfectly free, eases that fall so as to remove entirely the shock which would otherwise arise from the fall of the ball, and enables the employment of a heavy ball, which will act proportionately quicker than a light ball.

Any suitable latching mechanism which will be tripped by making or breaking an electrical circuit may be employed to hold the ball in suspension. A suitable mechanism for such engagement is illustrated in Figs. 2, 3, and 4. D is a U-shaped lever, hinged at its closed end, as at l. E is a second similar U-shaped lever, hinged at the opposite end, as at m, so as to close down over the lever d, as seen in Fig. 2, and be engaged with a latch, n, at its open end. The rod d, or a cord attached thereto, passes down through the levers with a cross-piece, F, of sufficient length to engage the two sides of the lower lever, D. This cross-piece is in this position when the ball is at its highest point of suspension. The latch n is in the electrical circuit as an armature to the magnet, or otherwise, and so that either by breaking or closing the circuit, as the case may be, the latch will be disengaged from the lever E in the usual manner of tripping such latches by electrical connection, and when the levers are thus free the weight of the ball draws up the rod d through the two levers, the levers rising for that purpose, as indicated in broken lines, Fig. 2. After the descent of the ball, and at the proper time, it is again drawn up and secured, as before, to await the electrical connection which trips it and permits the descent.

Instead of attaching the ball to the piston, so that the first movement draws the piston into the cylinder, this order may be reversed, and the weight hung to the piston, the cylinder lighter, and attached to the ball, so that the cylinder will first move and compress the air against the piston to which the weight is attached. Instead of air within the cylinder or weight, a spring may be applied—say, for illustration, a helical spring—above the piston, or between the piston and cylinder, so that the spring will receive the first power of the falling ball in like manner as does the air in the air-cylinder. I therefore do not wish to be understood as limiting my invention to the particular construction described of gradually applying the counterbalancing-weight.

I claim—

1. The combination of a time-ball with a counterbalancing-weight supported independent of the ball when the ball is raised, with an elastic device between said weight and ball, whereby the weight is gradually applied to the descending ball, substantially as described.

2. The combination of a time-ball, a cylinder-weight, a piston in said cylinder in connection with the ball, and a support for the cylinder when the ball is raised, the piston and its rod free to move in said cylinder as the ball descends, and arranged to compress the air or other spring within the cylinder, whereby the weight of the cylinder is gradually applied to the descending ball, substantially as described.

3. The combination of a time-ball, a cylinder-weight, a piston in said cylinder in connection with the ball, and a support for the cylinder when the ball is raised, the piston and its rod free to move in said cylinder as the ball descends, and arranged to compress the air or other spring within the cylinder, whereby the weight of the cylinder is gradually applied to the descending ball, the rod through the piston provided with a collar at a distance below the piston, substantially as and for the purpose described.

4. The herein-described device for holding time-balls suspended, consisting of the two U-shaped hinged levers D E, through which the suspending rod or cord passes the cross-piece F on the rod below the levers, and the latch n to hold said levers engaged, substantially as described.

ROBERT W. WILLSON.

Witnesses:
JOHN E. EARLE,
JOS. C. EARLE.